United States Patent
Chahal et al.

(10) Patent No.: US 10,899,433 B2
(45) Date of Patent: Jan. 26, 2021

(54) SYSTEM AND METHOD FOR FEATHERING AN AIRCRAFT PROPELLER

(71) Applicant: PRATT & WHITNEY CANADA CORP., Longueuil (CA)

(72) Inventors: Jasraj Chahal, Lasalle (CA); Carmine Lisio, Laval (CA); Jim R. Jarvo, Saint Bruno (CA); Darragh McGrath, Montreal (CA); Giancarlo Zingaro, Pointe-Claire (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 225 days.

(21) Appl. No.: 16/031,462

(22) Filed: Jul. 10, 2018

(65) Prior Publication Data

US 2020/0017197 A1 Jan. 16, 2020

(51) Int. Cl.
*B64C 11/38* (2006.01)
*B64C 11/42* (2006.01)

(52) U.S. Cl.
CPC ............ *B64C 11/385* (2013.01); *B64C 11/42* (2013.01)

(58) Field of Classification Search
CPC .............................. B64C 11/385; B64C 11/42
See application file for complete search history.

(56) References Cited

U.S. PATENT DOCUMENTS

| | | | |
|---|---|---|---|
| 2,360,791 A | 10/1944 | Putnam et al. | |
| 2,699,220 A * | 1/1955 | Mergen | B64C 11/42 416/46 |
| 3,589,830 A * | 6/1971 | Mogren | B63H 3/10 416/1 |
| 3,679,033 A * | 7/1972 | Wagner | F16D 25/14 192/48.7 |
| 4,533,296 A | 8/1985 | Duchesneau et al. | |
| 4,588,354 A * | 5/1986 | Duchesneau | B64C 11/38 416/27 |
| 5,019,006 A | 5/1991 | Schneider et al. | |
| 5,174,718 A * | 12/1992 | Lampeter | B64C 11/38 416/157 R |
| 5,209,640 A * | 5/1993 | Moriya | B64C 11/40 416/27 |
| 5,213,471 A * | 5/1993 | Miller | B64C 11/325 416/129 |

(Continued)

*Primary Examiner* — Aaron R Eastman
*Assistant Examiner* — Theodore C Ribadeneyra
(74) *Attorney, Agent, or Firm* — Norton Rose Fulbright Canada LLP

(57) ABSTRACT

A system and method for feathering an aircraft propeller are provided. A first feather solenoid and a second feather solenoid each comprising at least one solenoid coil and a solenoid valve coupled to the actuator and to the at least one solenoid coil are provided. At least one controller is configured to selectively energize and de-energize the at least one solenoid coil. The solenoid valve of the first feather solenoid is configured to be activated when the at least one solenoid coil of the first feather solenoid is energized and the solenoid valve of the second feather solenoid is configured to be activated when the at least one solenoid coil of the second feather solenoid is de-energized. The solenoid valve is configured to, when activated, modulate the supply of hydraulic fluid to an actuator for adjusting a blade pitch of the propeller towards a feather position.

20 Claims, 9 Drawing Sheets

(56) References Cited

U.S. PATENT DOCUMENTS

| | | | | |
|---|---|---|---|---|
| 5,284,418 A | * | 2/1994 | Moriya | B64C 11/44 |
| | | | | 416/35 |
| 5,299,911 A | * | 4/1994 | Moriya | B64C 11/44 |
| | | | | 416/35 |
| 5,562,417 A | | 10/1996 | Grimm et al. | |
| 5,897,293 A | | 4/1999 | Arel et al. | |
| 5,997,250 A | | 12/1999 | Carter, Jr. et al. | |
| 6,422,816 B1 | | 7/2002 | Danielson | |
| 6,685,138 B1 | * | 2/2004 | Krantz | B64C 13/42 |
| | | | | 244/99.5 |
| 6,811,376 B2 | * | 11/2004 | Arel | B64C 11/38 |
| | | | | 416/155 |
| 8,162,086 B2 | * | 4/2012 | Robinson | B60K 11/04 |
| | | | | 123/41.49 |
| 9,120,559 B2 | * | 9/2015 | Danielson | B64C 11/38 |
| 2004/0033136 A1 | * | 2/2004 | Bettencourt | F04D 29/362 |
| | | | | 416/1 |
| 2011/0023836 A1 | * | 2/2011 | Verner | F02D 41/20 |
| | | | | 123/490 |
| 2013/0251499 A1 | * | 9/2013 | Rampen | F15B 20/007 |
| | | | | 415/1 |
| 2013/0307493 A1 | * | 11/2013 | Ichinose | F03D 9/255 |
| | | | | 322/40 |
| 2014/0242859 A1 | * | 8/2014 | Ochiai | B63H 20/28 |
| | | | | 440/88 M |

\* cited by examiner

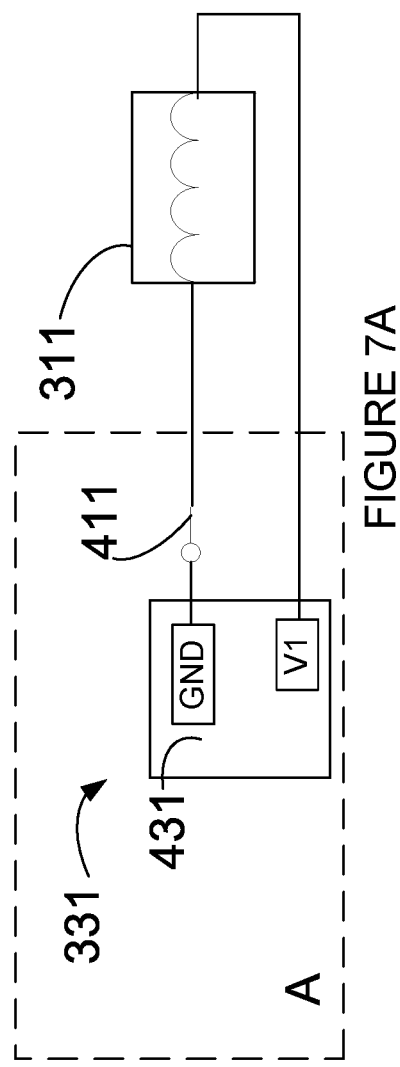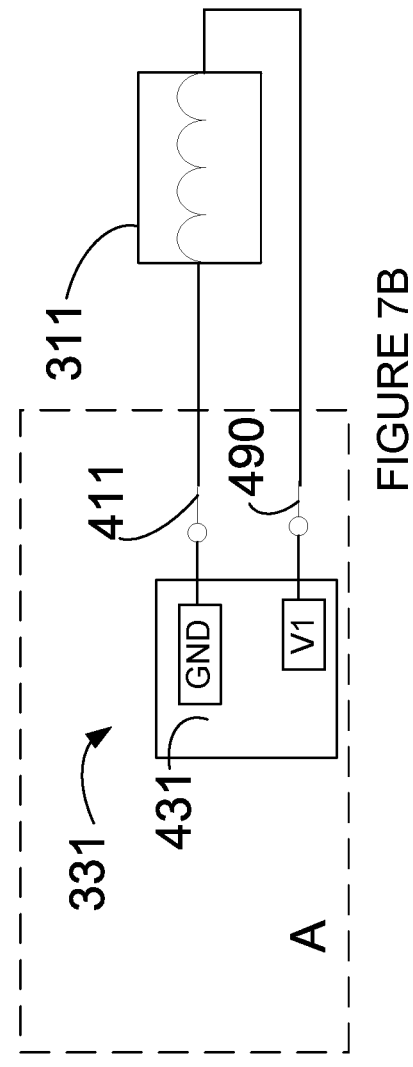

SYSTEM AND METHOD FOR FEATHERING AN AIRCRAFT PROPELLER

TECHNICAL FIELD

The application relates generally to propeller control systems for aircraft engines and, more particularly, to a system and method for feathering an aircraft propeller.

BACKGROUND

Actuation of propeller blade pitch to the feather position is typically done through a bypass circuit of a pitch control unit, in order to quickly actuate the propeller blades to change the blade pitch to the feather position. Typically, the bypass circuit is controlled by an electro-hydraulic actuator referred to as a feather solenoid.

The feather solenoid as a sub-component of the pitch change actuator of the pitch control unit conventionally has a single coil that is electrically driven to cause the blade pitch to change to the feather position. In particular, when the feather solenoid is electrically driven, oil used to control the pitch change actuator is redirected to drive the propeller blades in the pitch direction towards the feather position. The feather solenoid is typically designed to require electrical power to energize.

However, as existing propeller control systems use electrical power to energize the solenoid which feathers the propeller, the propeller control system would not be able to feather the propeller in the event of loss of electrical power.

There is thus a need for improved systems and methods for feathering an aircraft propeller.

SUMMARY

In accordance with an aspect, a system for feathering an aircraft propeller is provided. The aircraft propeller has coupled thereto an actuator for setting a blade pitch of the propeller. The blade pitch is controlled by modulating a supply of hydraulic fluid to the actuator. The system comprises: a first feather solenoid and a second feather solenoid each comprising at least one solenoid coil and a solenoid valve coupled to the actuator and to the at least one solenoid coil; and at least one controller configured to selectively energize and de-energize the at least one solenoid coil, the solenoid valve of the first feather solenoid configured to be activated when the at least one solenoid coil of the first feather solenoid is energized and the solenoid valve of the second feather solenoid configured to be activated when the at least one solenoid coil of the second feather solenoid is de-energized, the solenoid valve configured to, when activated, modulate the supply of hydraulic fluid to the actuator for adjusting the blade pitch of the propeller towards a feather position.

In accordance with an aspect, a method for feathering an aircraft propeller is provided. The aircraft propeller has coupled thereto an actuator for setting a blade pitch of the propeller. The method comprises: providing a first feather solenoid configured as electrically powered to command the propeller to feather and a second feather solenoid configured as electrically de-powered to command the propeller to feather, the first and the second solenoid coupled to the actuator; when at least one controller configured to selectively energize and de-energize the first and the second feather solenoid is functioning, operating in a first mode in which the first feather solenoid is energized to command the actuator to adjust the blade pitch towards a feather position; and when the at least one controller is non-functioning, operating in a second mode in which the second feather solenoid is de-energized to command the actuator to adjust the blade pitch towards the feather position.

BRIEF DESCRIPTION OF DRAWINGS

Reference is now made to the accompanying figures in which:

FIG. 7A is a schematic diagram of an example solenoid driver with a low side switch, in accordance with an embodiment;

FIG. 7B is a schematic diagram of an example solenoid driver with a low side switch and a high side switch, in accordance with an embodiment;

DETAILED DESCRIPTION

Figure 1:
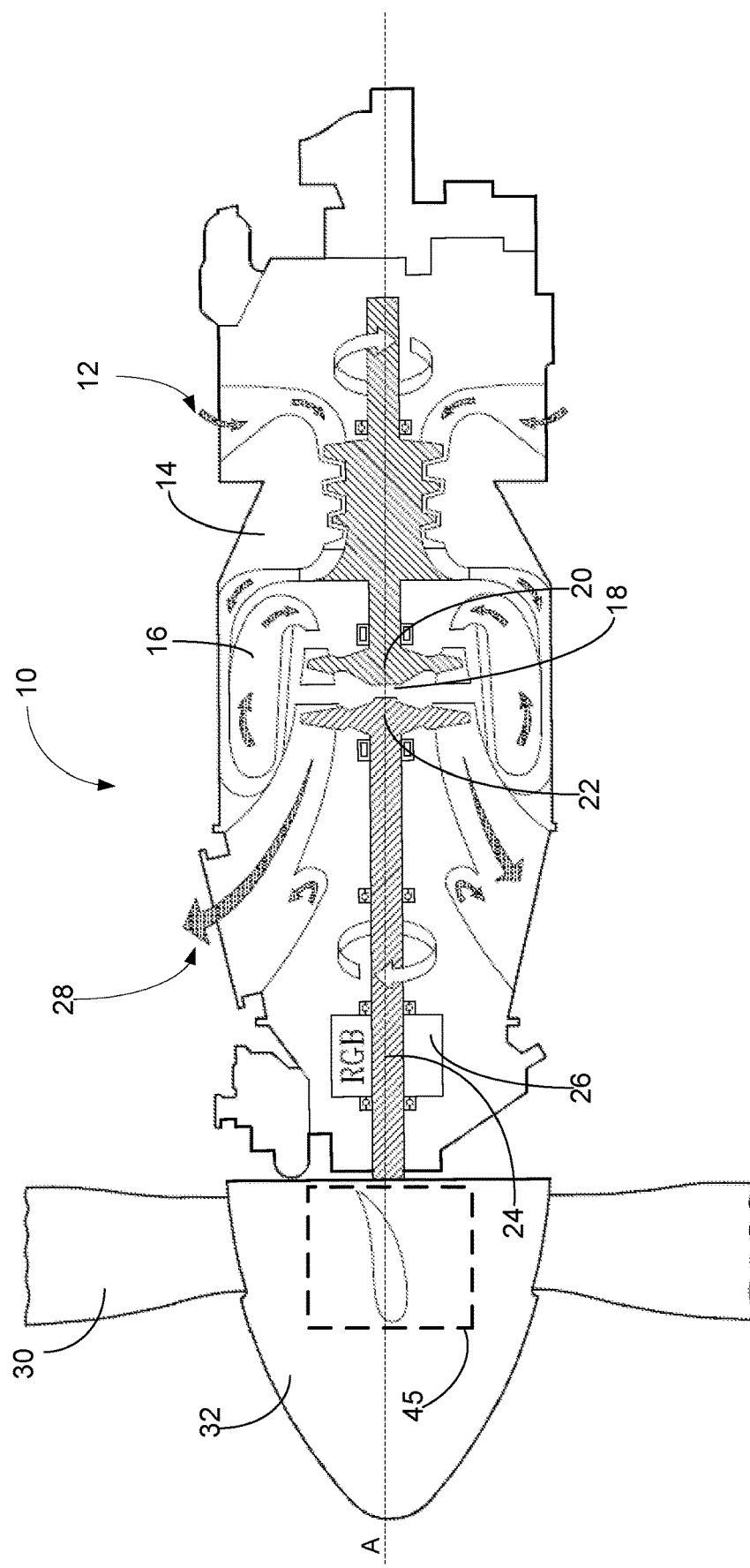
FIG. 1 is a schematic cross-sectional view of a gas turbine engine.

FIG. 1 illustrates a gas turbine engine 10, of a type typically provided for use in subsonic flight, comprising an inlet 12, through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and rotatingly drives a rotor shaft 24 about a longitudinal propeller shaft axis A through a reduction gear box 26. Hot gases may then be evacuated through exhaust stubs 28. The gas generator of the engine 10 illustratively comprises the compressor section 14, the combustor 16, and the turbine section 18. A rotor 30, in the form of a propeller through which ambient air is propelled, is hosted in a propeller hub 32. Rotor 30 may, for example, comprise a propeller of a fixed-wing aircraft or a main (or tail) rotor of a rotary-wing aircraft such as a helicopter. The rotor 30 may comprise a plurality of circumferentially-arranged blades connected to a hub any suitable means and extending radially therefrom. The blades are also each rotatable about their own radial axes through a plurality of blade angles, which can be changed to achieve modes of operation, such as feather, full reverse, and forward thrust. The blade angle (also referred to herein as the "blade pitch") of the propeller 30 may be controlled by a pitch control unit (PCU) 45.

Figure 2:
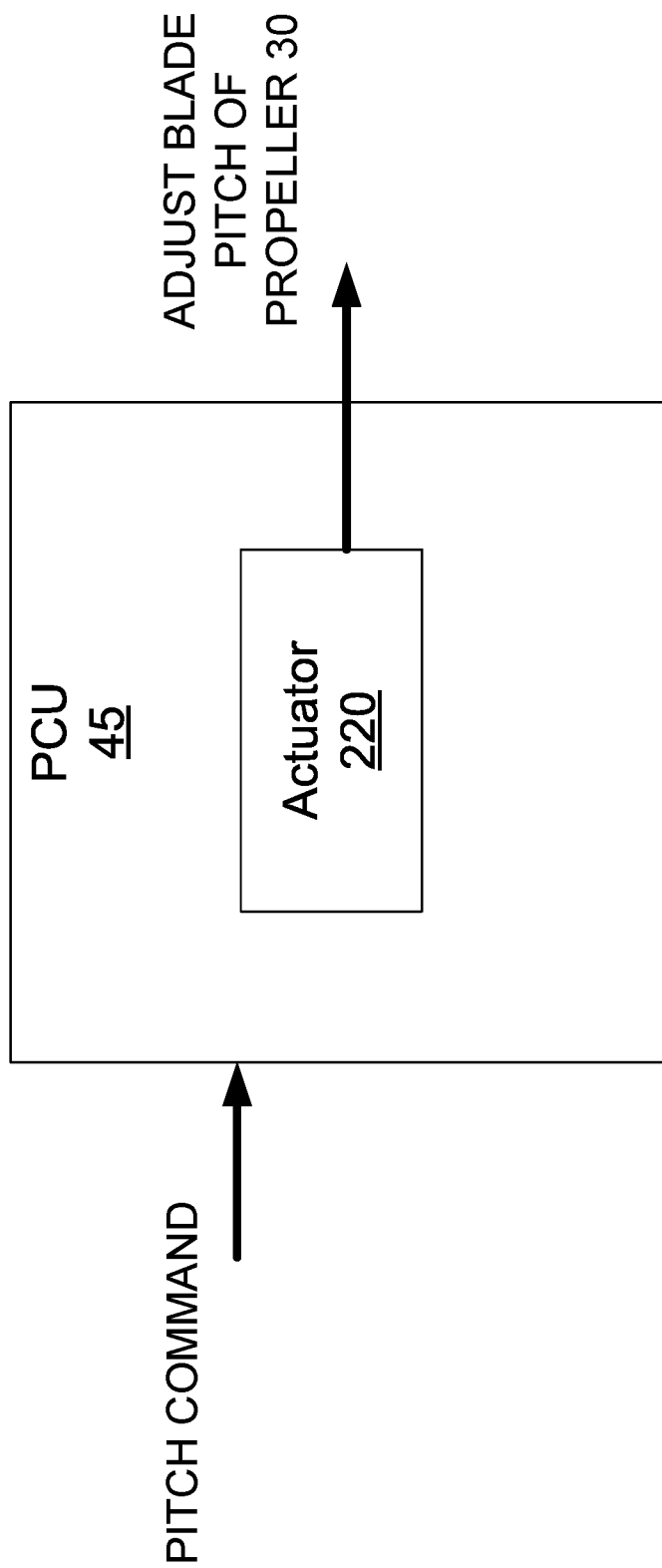
FIG. 2 is a block diagram of an example of a pitch control unit, in accordance with an illustrative embodiment.

With additional reference to FIG. 2, in accordance with one embodiment, the PCU 45 comprises a hydraulic circuit driven by hydraulic fluid (e.g., oil) provided to the hydraulic circuit by one or more pumps of the engine 10. The hydraulic circuit comprises a pitch change actuator 220 and the blade pitch may be controlled by modulating hydraulic fluid pressure (e.g., oil pressure) in the pitch change actuator 220, which causes a rotational twist of the blades. That is, the blade pitch of the propeller 30 is variable and may be modified by the pitch change actuator 220. An electronic controller (not illustrated in FIG. 2) may command the PCU 45 to change the blade pitch. The electronic controller may receive commands to change the blade pitch from an aircraft lever or an aircraft computer. For example, the electronic controller may receive commands to control the blade pitch into a feather position. Alternatively, a mechanical or hydro-mechanical control mechanisms (not illustrated) connected to control levers in the cockpit of the aircraft may be used to command the PCU 45 to change the blade pitch. The pitch change actuator 220 may take different forms, depending on the type of engine and/or aircraft. The pitch change actuator may be a hydraulic actuator or an electro-hydraulic actuator. In some embodiments, there may be gearing, such as that found on turboprop aircraft. The implementation of PCU 45 may vary depending on practical implementations.

Figure 3:
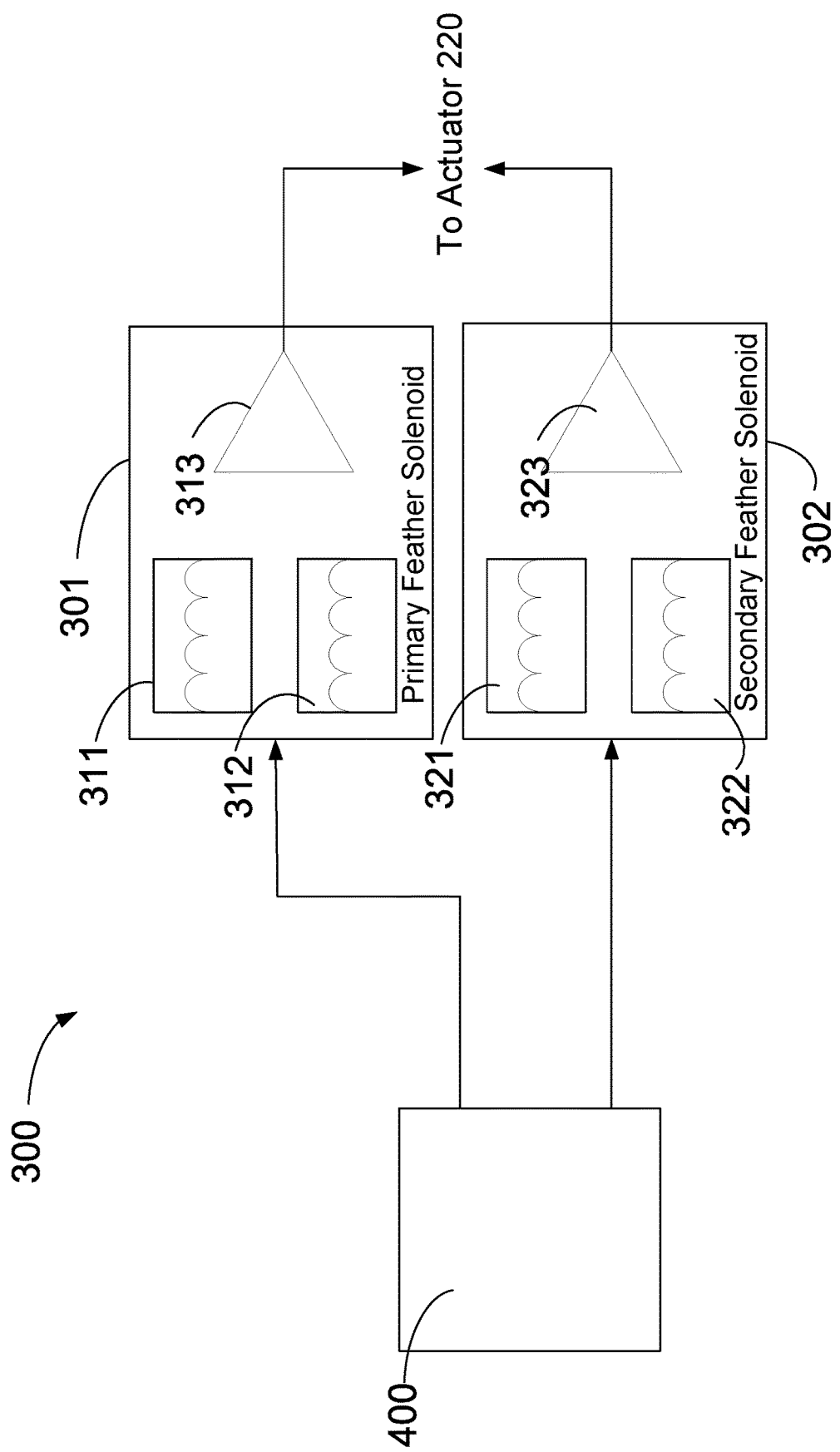
FIG. 3 is a schematic diagram of a system for feathering an aircraft propeller, in accordance with an illustrative embodiment.

FIG. 3 illustrates a system 300 for feathering a propeller of an engine, such as the engine 10 of FIG. 1. The system 300 comprises a first electro-hydraulic actuator 301 and a second electro-hydraulic actuator 302, each configured for feathering the propeller 30. Each of the electro-hydraulic actuators 301, 302 is referred to herein as a "feather solenoid" or a "solenoid". Each of the feather solenoids 301, 302 comprise at least one solenoid coil 311, 321 and a solenoid valve 313, 323 coupled to the at least one solenoid coil 311, 321. In the illustrated embodiment, the feather solenoids 301, 302 are dual coil feather solenoids and each comprise a first solenoid coil 311, 321 and a second solenoid coil 312, 322. As illustrated, the solenoid valve 313, 323 is coupled to the first solenoid coil 311, 321 and the second solenoid coil 312, 322. In some embodiments, two single coil feather solenoids may be used for each of the feather solenoids 301, 302. The feather solenoids 301, 302 are each configured for modifying the blade pitch of the propeller 30 to drive the propeller 30 towards the feather position. More specifically, the first feather solenoid 301 is a primary feather solenoid and is configured to be energized to adjust a blade pitch of the propeller to the feather position. The second feather solenoid 302 is a secondary or backup solenoid and is configured to be de-energized to adjust the blade pitch to the feather position. In accordance with an embodiment, the feather solenoids 301, 302 are provided as part of the PCU 45. In accordance with an embodiments, the feather solenoids 301, 302 are provided separate from the pitch change actuator 220. The pitch change actuator 220 is a device that allows for fine adjustment of propeller blade angle over the full range of the propeller blade pitch. While the pitch change actuator 220 may be used to drive the propeller to feather, the time it would take typically would be greater than with the feather solenoids 301, 302. By using the feather solenoids 301, 302, which conducts the feather function, this ensures that propeller control via the pitch change actuator 220 and propeller protection functions via the feather solenoids 301, 302 are separate controls and outputs. It should be appreciated that, in some embodiments, this ensures that no single electrical failure will lead to the inability of the propeller 30 to feather. While the feathering solenoids 301, 302 are for feathering the propeller 30 and are illustrated as forming an actuator independent from the pitch change actuator 220, it should be understood that a common actuator may be used for propeller feathering and pitch change.

Reference to "feathering" the propeller 30 or adjusting the blade pitch to "feather" the propeller refers to directing the blades of the propeller 30 to the feather position. Reference to "unfeather" or "unfeathering" of the propeller 30 refers to directing the blades of the propeller 30 to a position other than the feather position. In the feather position, the blade pitch is positioned where a maximum rotational drag and a minimum forward motion exists. Controlling the propeller blade pitch to the feather position may be performed, for example, on the ground following an engine start, preceding a shutdown of the engine on ground or in flight, and/or on a failed engine during the take-off phase.

The secondary feather solenoid 302 may be implemented as described in U.S. patent application Ser. No. 16/031,361, the contents of which are hereby incorporated by reference.

At least one controller 400 is configured to selectively energize and de-energize the solenoid coils 311, 321 of the primary feather and secondary feather solenoids 301, 302. In accordance with an embodiment, the solenoid valve 313 of the primary feather solenoid 301 is configured to be activated when the at least one solenoid coil 311 of the primary feather solenoid 301 is energized and the solenoid valve 323 of the secondary feather solenoid 302 is configured to be activated when the at least one solenoid coil 321 of the secondary feather solenoid 302 is de-energized. In other words, in embodiments where each feather solenoid 301, 302 comprises a single solenoid coil 311, 321, the primary feather solenoid 301 is configured to be activated when the solenoid coil 311 is energized and the secondary feather solenoid 302 is configured to be activated when the solenoid coil 311 is de-energized. In accordance with an embodiment, where each feather solenoid 301, 302 comprises dual solenoid coils 311, 312, 321, 322, the primary feather solenoid 301 is configured to be activated when at least one of the solenoid coil 311, 312 is energized and the secondary feather solenoid 302 is configured to be activated when both the solenoid coils 321, 322 are de-energized. The solenoid valve 313, 323 is configured to, when activated, modulate the supply of hydraulic fluid to the actuator 220 for adjusting the blade pitch of the propeller 30 towards the feather position.

Figure 4:
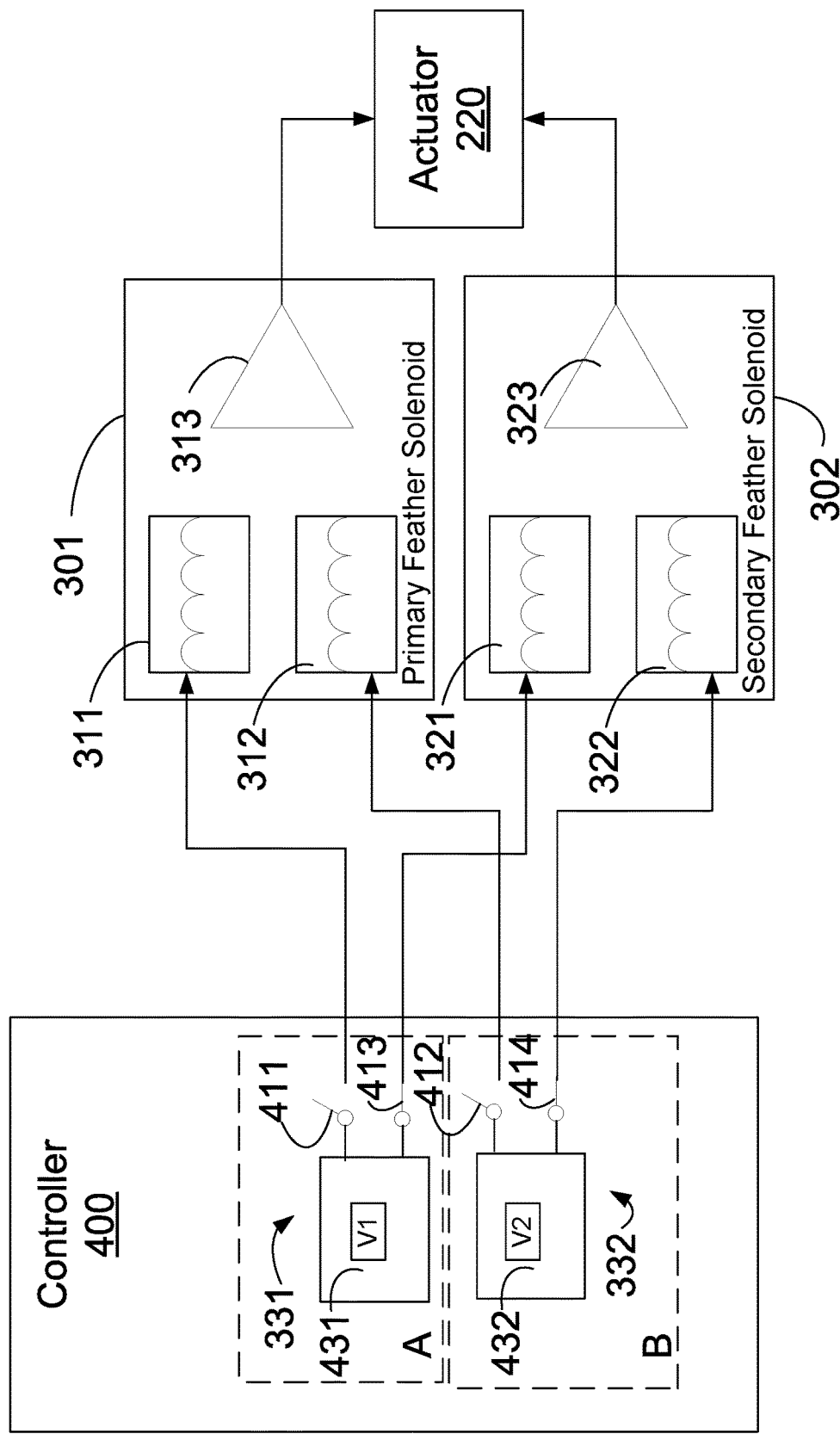
FIG. 4 is a schematic diagram of the system of FIG. 3, illustrating an example where the propeller is not being directed to feather by the system.
Figure 5:
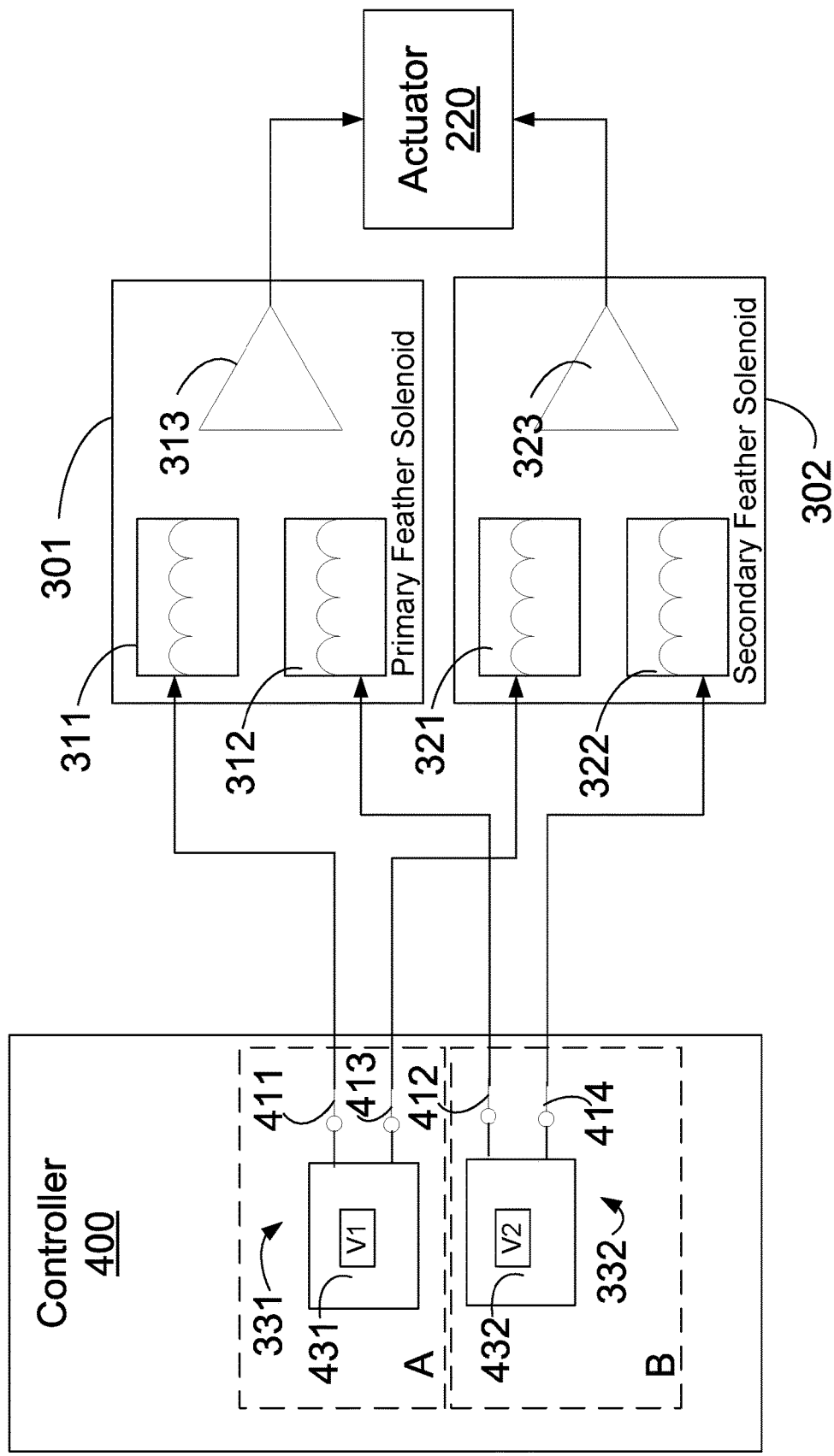
FIG. 5 is a schematic diagram of the system of FIG. 3, illustrating a first example where the propeller is directed to feather.
Figure 6:
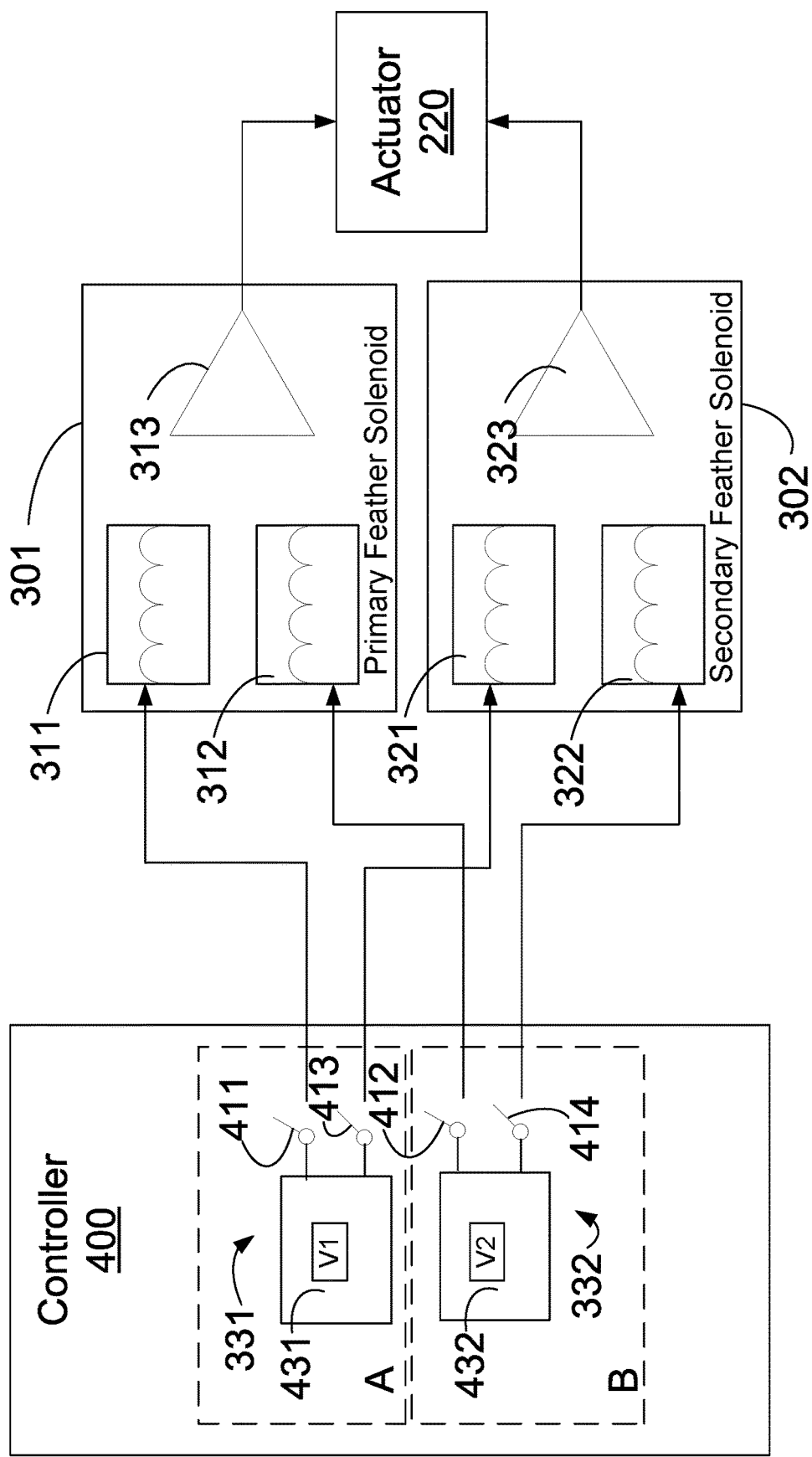
FIG. 6 is a schematic diagram of the system of FIG. 3, illustrating a second example where the propeller is directed to feather.

With reference to FIGS. 4 to 6, in accordance with an embodiment, the controller 400 comprises of a first solenoid driver 331 to selectively energize (or power) and de-energize (or de-power) the first solenoid coils 311 and 321 of feather solenoids 301 and 302, respectively. The controller 400 also comprises of a second solenoid drive 332 to selectively energize and de-energize the second solenoid coils 312 and 322 of feather solenoids 301 and 302, respectively. When the first solenoid driver 331 supplies electrical power to the first solenoid coils 311 and 321 from a first power source 431, the first solenoid coils 311 and 321 are energized. When the first solenoid driver 331 does not supply electrical power to the first solenoid coils 311 and 321 from the first power source 431, the first solenoid coils 311 and 321 are de-energized. Likewise, when the second solenoid driver 332 supplies electrical power to the second solenoid coils 312 and 322 from a second power source 432, the second solenoid coils 312 and 322 are energized. When the second solenoid driver 332 does not supply electrical power to the second solenoid coils 312 and 322 from the second power source 432, the second solenoid coils 312 and 322 are de-energized.

The primary feather solenoid 301 is configured to actuate the propeller blades to change the blade pitch to the feather position when at least one of the first solenoid coil 311 and the second solenoid coil 312 is energized. The secondary feather solenoid 302 is configured to actuate the propeller blades to change the blade pitch to the feather position when both the first solenoid coil 321 and the second solenoid coil 322 are de-energized. For example, the feather solenoids 301, 302 are configured to control a bypass circuit of the pitch control unit 45 to drive the propeller 30 to the feather position. In accordance with an embodiment, when one of the coils 311, 312 is energized, hydraulic fluid from a fine pitch hydraulic circuit is redirected to drain, and when this occurs, a protection valve of the pitch change actuator 220 translates such that the flow rate of hydraulic fluid to a coarse pitch hydraulic circuit is increased. Similarly, in accordance with an embodiment, when both of the coils 321, 322 are de-energized, hydraulic fluid from a fine pitch hydraulic circuit is redirected to drain, and when this occurs, the protection valve of the pitch change actuator 220 translates such that the flow rate of hydraulic fluid to the coarse pitch hydraulic circuit is increased. In other words, the solenoid valve 313, 323 is configured to control hydraulic fluid in the pitch change actuator 220 in order to adjust the blade pitch of the propeller 30 to feather. The first solenoid valve 313 is configured to be activated when either one of the first solenoid coil 311 or the second solenoid coil 312 of the primary solenoid 301 is energized. The second solenoid valve 323 is configured to be activated when both the first solenoid coil 321 and the second solenoid coil 322 of the secondary solenoid 302 are de-energized. When the solenoid valve 313, 323 is activated, the solenoid valve 313, 323 causes a supply of hydraulic fluid to the propeller 30 to be modified for adjusting the blade pitch of the propeller 30 towards the feather position. In particular, when the solenoid valve 313, 323 is activated, the solenoid valve 313, 323 is configured to control the supply of hydraulic fluid in the pitch change actuator 220 to drive the propeller to feather. Controlling the supply of hydraulic fluid in the pitch change actuator 220 to drive the propeller to feather may comprise redirecting the hydraulic fluid in the pitch change actuator 220, modulating pressure of the hydraulic fluid and/or any other suitable adjustment to the hydraulic fluid in the pitch change actuator 220.

In one embodiment, by requiring one of the solenoid coils 311, 312 of the primary solenoid 301 to be energized to feather the propeller 30, it should be appreciated that if one of the solenoid drivers 331, 332 is non-functioning, the functional one of the solenoid drivers 331, 332 may still be used to command the propeller 30 to feather or unfeather. Furthermore, in one embodiment, by requiring both of the solenoid coils 321, 322 of the secondary solenoid 302 to be de-energized to feather the propeller 30, it should be appreciated that if both of the solenoid drivers 331, 332 are non-functioning, the propeller 30 would be commanded to feather. Thus, in one embodiment, the secondary solenoid 302 acts as a backup to provide an alternative mechanism to feather the propeller 30. For example, in the case of a fire, when wires from the controller 400 are burned, the secondary solenoid 302 would be de-powered and the propeller 30 would be driven to the feather position. By way of another example, when both the solenoid drivers 331, 332, are depowered (e.g., due to lack of power or case of fire), the controller 400 may not be able to guarantee that it is governing at the target propeller speed and to avoid propeller overspeed or operating below the minimum permissible in-flight propeller pitch angle, it is desirable to feather the propeller 30.

FIG. 4 illustrates the system 300 under normal operation where the propeller 30 is not being directed to feather by the controller 400. In this embodiment, the primary feather solenoid 301 is configured to be energized to drive the propeller 30 to the feather position. For this purpose, the first solenoid driver 331 is configured to de-energize the first solenoid coil 311 of the primary solenoid 301 by not connecting the first solenoid coil 311 to the first power source 431 and the second solenoid driver 332 is configured to de-energize the second solenoid coil 312 of the primary solenoid 301 by not connecting the second solenoid coil 312 to the second power source 432. The first power source 431 and the second power source 432 are independent electrical power sources. In this embodiment, the secondary feather solenoid 302 is configured to be de-energized to drive the propeller 30 to the feather position. For this purpose, the first solenoid driver 331 is configured to energize the first solenoid coil 321 of the secondary solenoid 302 by connecting the first solenoid coil 321 to the first power source 431 and to energize the second solenoid coil 322 of the secondary solenoid 302 by connecting the secondary solenoid coil 322 to the second power source 432. In accordance with an embodiment, under normal operation, as long as one of the first solenoid coil 321 and the second solenoid coil 322 of the secondary solenoid 302 are energized, the secondary feather solenoid 302 would not drive the propeller 30 to the feather position.

In accordance with an embodiment, each of the solenoid drivers 331, 332 comprises a first electrical switch 411, 412 controllable between an open and a closed position. A corresponding one of the first electrical switches 411, 412 is configured to, when in the closed position, connect a corresponding one of the solenoid coils 311, 312 to a corresponding power source 431, 432 in order to energize the solenoid coil 311, 312 and to, when in the open position, disconnect the solenoid coil 311, 312 from the power source 431, 432 in order to de-energize the solenoid coil 311, 312. Similarly, in accordance with an embodiment, each of the solenoid drivers 331, 332 comprises a second electrical switch 413, 414 controllable between an open and a closed position. A corresponding one of the second electrical switches 413, 414 is configured to, when in the closed position, connect a corresponding one of the solenoid coils 321, 322 to a corresponding power source 431, 432 in order to energize the solenoid coils 321, 322 and to, when in the open position, disconnect the solenoid coils 321, 322 from the power source 431, 432 in order to de-energize the solenoid coil 321, 322.

In accordance with an embodiment, each of the solenoid coils 311, 312, 321, 322 has two ends, where one of the ends is for connecting to a voltage V1, V2 generated by the first or the second power source 431, 432 and the other end is for connecting to ground GND. The switches 411, 412, 413, 414 may be used to connect the respective solenoid coils 311, 312, 321, 322 to and from ground GND. Alternatively, the switches 411, 412 may be used to connect the respective solenoid coils 311, 312, to and from a first voltage V1 of the first power source 431 and the switches 413, 414 may be used to connect the respective solenoid coils 321, 322, to and from a second voltage V2 of the second power source 432.

With additional reference to FIG. 7A, in accordance with one example embodiment, the first solenoid driver 431 is illustrated as connected to the first solenoid coil 311. In this example, the first electrical switch 411 is configured to, when in the closed position, connect the solenoid coils 311 to ground GND in order to energize the solenoid coil 311 and to, when in the open position, disconnect the solenoid coil 311 from ground GND in order to de-energize the solenoid coil 311. The first solenoid driver 431 may further be configured to connect/disconnect the solenoid coils 321 to/from ground GND via the second switch 413. The second solenoid driver 432 may be configured in a similar manner to the first solenoid driver 431 in order to connect/disconnect the solenoid coils 312, 322 to/from ground GND using the second switches 412, 414.

In accordance with an embodiment, the first solenoid coil 311 is connected to the first voltage V1, the second solenoid coil 312 is connected to the second voltage V2, the first electrical switch 411 is used to connect/disconnect the first solenoid coil 311 to/from ground GND, and the first electrical switch 412 is used to connect/disconnect the second solenoid coil 312 to/from ground GND. Similarly, in this example, the first solenoid coil 321 is connected to the first voltage V1, the second solenoid coil 322 is connected to the second voltage V2, the second electrical switch 413 is used to connect/disconnect the first solenoid coil 321 to/from ground GND, and the second electrical switch 414 is used to connect/disconnect the second solenoid coil 322 to/from ground GND.

The switches 411, 412, 413, 414 may be controlled by the electronic controller 400 and in the illustrated embodiment the electronic controller 400 comprises the switches 411, 412, 413, 414. Alternatively, the switches 411, 412, 413, 414 may be separate from the electronic controller 400. Each of the first switches 411, 412, 413, 414 may be referred to as a low side switch (LSS), as they are used to connect/disconnect the solenoid coils 311, 312, 321, 322 to/from ground GND. In accordance with an embodiment, the switches 411, 412, 413, 414 are configured to default to the open position when the electronic controller 400 is unpowered.

In some embodiments, each of the solenoid drivers 331, 332 comprises a third and fourth electrical switch (not illustrated) controlled by the electronic controller 400 and controllable between an open position and a closed position. These switches may be referred to as a high side switch (HSS), as they may be used to connect/disconnect the solenoid coils 311, 321, to/from the first voltage V1 of the first power source and may be used to connect/disconnect the solenoid coils 312, 322, to/from the second voltage V2 of the second power source. For example, FIG. 7B illustrates a high side switch 490 used to connect/disconnect the solenoid coil 311 to the first voltage V1. Similarly, an additional high side switch may be used to connect/disconnect the solenoid coil 321 to/from the first voltage V1. The second solenoid driver 432 may be configured, in a similar manner to the first solenoid driver 431, to comprise high side switches to connect the solenoid coils 312, 322 to/from the second voltage V2. In accordance with an embodiment, the high side switches may be configured to remain closed. In an alternative embodiment, the high side switches may be controlled in a similar manner to the low side switches described herein and the low side switches may be configured to remain closed. In other embodiments, both low side switch (e.g., switch 411) and high side switch (e.g., switch 480) of a given solenoid driver (e.g., solenoid driver 331) are both controlled by the controller 400 such that the pair of switches (e.g., switches 411, 480) is either in the open or closed position. In other embodiments, pulse-width-modulation (PWM) may be applied to the low side switches to control the switches.

FIG. 5 illustrates the system 300 when the primary feather solenoid 301 is activated by the controller 400 to feather the propeller 30. For example, the controller 400 may activate the primary feather solenoid 301 due to receiving a feather command (e.g., based on protection functions or routine request to feather). As illustrated, the first solenoid driver 331 is configured to energize the first solenoid coil 311 of the primary feather solenoid 301 in response to receiving a feather command and the second solenoid driver 332 is configured to energize the second solenoid coil 312 of the primary feather solenoid 301 in response to receiving the feather command. As shown, the first electrical switch 411 of the first solenoid driver 331 is configured to move to the closed position in response to receiving the feather command and the first electrical switch 412 of the second solenoid driver 332 is configured to move to the closed position in response to receiving the feather command. In this embodiment, the first solenoid driver 331 is configured to energize the first solenoid coil 321 of the secondary solenoid 302 by connecting the first solenoid coil 321 to the first power source 431 and to energize the second solenoid coil 322 of the secondary solenoid 302 by connecting the second solenoid coil 322 to the second power source 432.

FIG. 6 illustrates the system 300 when the secondary feather solenoid 302 causes the propeller 30 to feather when the controller 400 is de-powered. As illustrated, the first solenoid driver 331 is configured to de-energize the first solenoid coil 321 of the secondary feather solenoid 302 when the first solenoid driver 331 is non-functioning and the second solenoid driver 332 is configured to de-energize the second solenoid coil 322 of the secondary feather solenoid 302 when the second solenoid driver 332 is non-functioning.

In accordance with an embodiment, the electronic controller 400 comprises a first channel A for controlling the first solenoid driver 331 and a second channel B for controlling the second solenoid driver 332. The first channel A is powered by the first power source 431 and the second channel B is powered by the second power source 432. In accordance with an embodiment, the controller 400 is connected to two independent power sources in order to provide the power sources 431, 432. Accordingly, while the power sources 431, 432 are illustrated as part of the controller 400, the power sources 431, 432 may be external of the controller 400. In some embodiments, the electronic controller 400 is a full-authority digital engine control (FADEC). The electronic controller 400 may be referred to as a dual channel electronic controller or a dual channel FADEC. In accordance with an embodiment, the channels A, B are separate redundant channels that provide duplicate functionality. Alternatively, the first solenoid driver 331 and the second solenoid driver 332 may be provided as separate electronic controllers (implemented similarly to the electronic controller 400).

Channel A may control switches 411, 413 and channel B may control switches 412, 414. The control by either channel A or B of a switch 411, 412, 413, 414 may be irrespective of a channel-in-control (CIC) of the electronic controller 400. In the case of a single channel dispatch, such as when one of the channels (e.g., channel B) is non-functioning (e.g., failed or de-powered), only one of the solenoid coils (e.g., the first solenoid coil 321) of the secondary feather solenoid 302 would need to be commanded to de-energize to feather the propeller 30. This is because the first switch (e.g., the first switch 412 of the second solenoid driver 332) of the non-functioning channel (e.g., channel B) is configured to default to the open position when the channel is non-functioning. Since only one of the solenoid coils 311, 312 of the primary feather solenoid 301 needs to be energized to feather the propeller 30, the propeller 30 may be directed to feather if the first switch (e.g., the first switch 411) of the functional channel (e.g., channel A) is in the closed position. In the case that both of the channels A and B are non-functioning (e.g., when the controller 400 is de-powered), the second switches 413, 414 default to the open position, and the secondary feather solenoid 302 would thereby drive the propeller 30 to feather.

Figure 8:
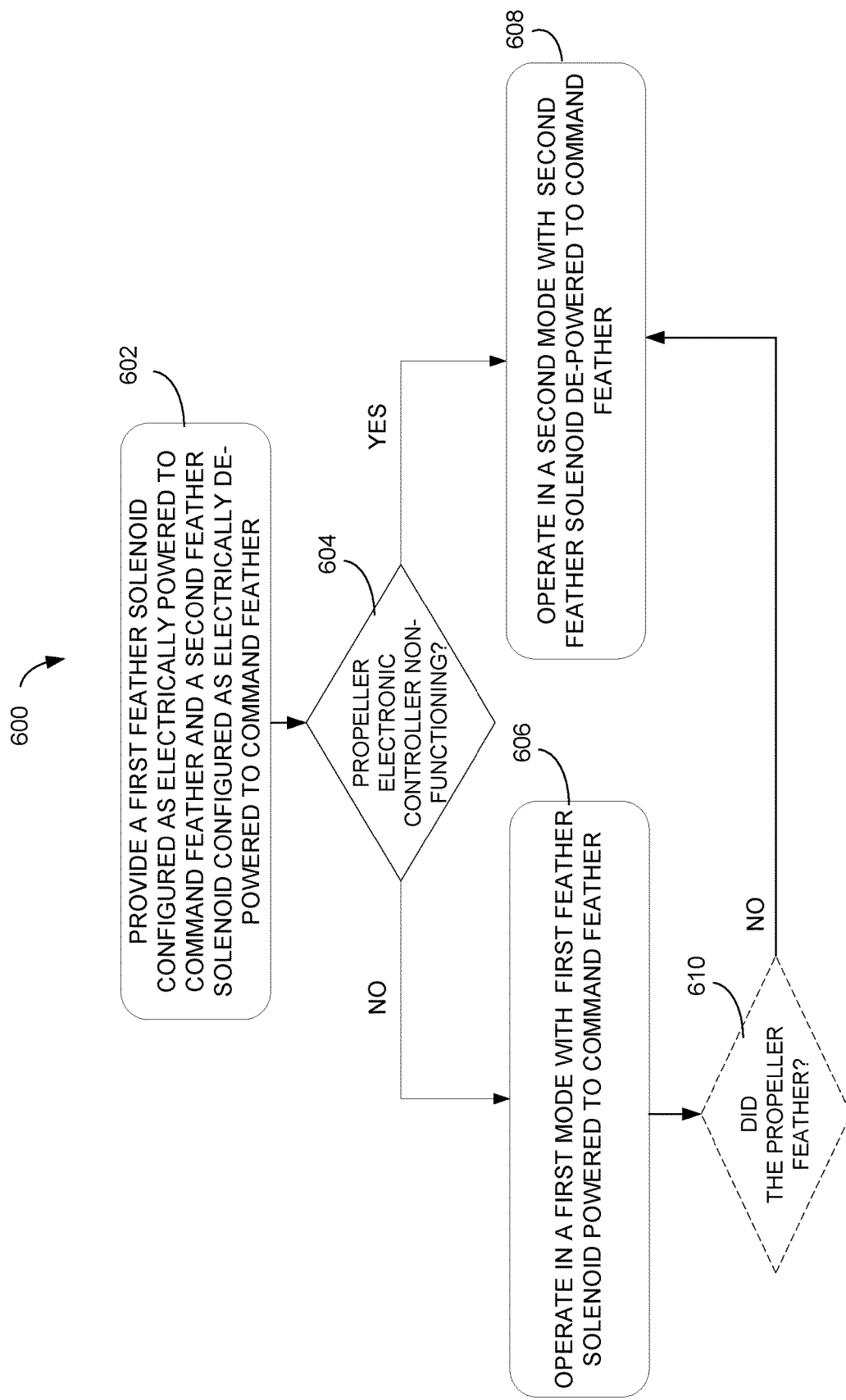
FIG. 8 is a flowchart of a method for feathering an aircraft propeller, in accordance with an embodiment.

With reference to FIG. 8, there is shown a flowchart illustrating an example method 600 for feathering an aircraft propeller. While method 600 is described herein with reference to engine 10, this is for example purposes. The method 600 may be applied to any suitable engine. At step 602, the primary feather solenoid 301 and the secondary feather solenoid 302 are provided, the primary feather solenoid configured as electrically powered to command feather and the secondary feather solenoid configured as electrically de-powered to command feather. In some embodiments, the primary feather solenoid 301 and the secondary feather solenoid 302 are each provided with one solenoid coil. In some embodiments, the primary feather solenoid 301 and the secondary feather solenoid 302 are each provided with two solenoid coils. The primary feather solenoid 301 and the secondary feather solenoid 302 may be provided as described elsewhere in this document.

Step 604, illustrates an assessment of whether the propeller electronic controller 400 is functioning or non-functioning. At step 606, when the controller 400 is functioning, the system 300 operates in a first mode. In the first mode the primary feather solenoid 301 is electrically powered to command the actuator 220 to feather the propeller 30. The first mode corresponds to the system 300 under normal operation. In the first mode, the controller 400 is configured to activate the first solenoid valve 313 by energizing the at least one solenoid coil of the primary feather solenoid 301 in response to receiving the feather command. At step 608, when the controller 400 is non-functioning, the system 300 operates in a second mode. In the second mode, the secondary feather solenoid 302 is electrically de-powered to command the actuator 220 to feather the propeller 30. The second mode corresponds to system 300 operating in a backup mode to provide an alternative mechanism to feather the propeller 30.

In some embodiments, after step 606, an assessment of whether the propeller has feathered or not feathered is performed at step 610. The assessment may comprise determining whether the propeller is in the feather position or is not in the feather position. If the propeller 30 has not feathered (i.e., is not in the feather position), then the method proceeds to step 608 to operate in the second mode. If the propeller 30 has feathered (i.e., is in the feather position), then no further steps may be performed.

In some embodiments, when the controller 400 is functioning, the controller 400 is configured, in response to receiving a feather command, to energize at least one of solenoid coil 311, 312 of the primary feather solenoid 301 to activate the first solenoid valve 313 coupled to the actuator 220 to command the propeller 30 to feather. In some embodiments, when the controller 400 is non-functioning, the first solenoid coil 321 and the second solenoid coil 322 of the secondary feather solenoid 323 are de-energized to activate the second solenoid valve 323 coupled to the actuator 220 to command the propeller 30 to feather.

In some embodiments, when the controller 400 is functioning, at least one of the first solenoid coil 311 and a second solenoid coil 312 of the primary feather solenoid 301 is energized to activate the solenoid valve 313 for commanding the actuator 220 to adjust the blade pitch towards the feather position. In some embodiments, when the controller 400 is non-functioning, both of the first solenoid coil 321 and the second solenoid coil 322 of the secondary feather solenoid 302 are de-energized to activate the solenoid valve 323 for commanding the actuator 220 to adjust the blade pitch towards the feather position.

In some embodiments, the controller 400 is configured to activate the first solenoid valve 313 by commanding the first solenoid driver 331 to energize the first solenoid coil 311 of the primary feather solenoid 301 or commanding the second solenoid driver 332 to energize the second solenoid coil 312 of the primary feather solenoid 301.

In some embodiments, commanding the first solenoid driver 331 to energize the first solenoid coil 311 of the primary feather solenoid 301 comprises commanding the first electrical switch 411 of the first solenoid driver 331 to a closed position for connecting the first solenoid coil 311 of the primary feather solenoid 301 to ground. In some embodiments, commanding the second solenoid driver 332 to energize the second solenoid coil 312 of the primary feather solenoid 301 comprises commanding the first electrical switch 412 of the second solenoid driver 332 to a closed position for connecting the second solenoid coil 312 of the primary feather solenoid 301 to ground.

Figure 9:
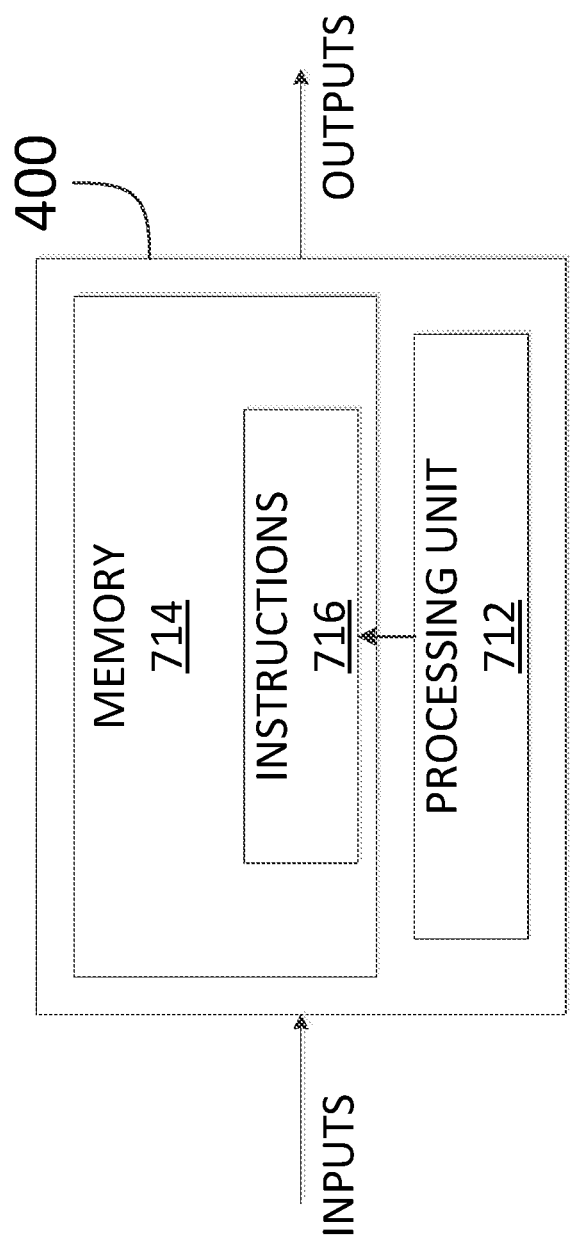
FIG. 9 is a block diagram of an example computing system for implementing the method of FIG. 8 in accordance with an embodiment.

With reference to FIG. 9, the method 600 may be implemented at least in part using the computing device 400 (also referred to herein as the electronic controller) comprising a processing unit 712 and a memory 714 which has stored therein computer-executable instructions 716. The processing unit 712 may comprise any suitable devices configured to implement the system such that instructions 716, when executed by the computing device 400 or other programmable apparatus, may cause the functions/acts/steps of the method 600 as described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712. In some embodiments, the computing device 400 can be implemented as part of a full-authority digital engine controls (FADEC) or other similar device, including electronic engine control (EEC), engine control unit (ECU), and the like.

The methods and systems for feathering an aircraft propeller described herein may be implemented in a high level procedural or object oriented programming or scripting language, or a combination thereof, to communicate with or assist in the operation of a computer system, for example the computing device 400. Alternatively, the methods and systems for feathering an aircraft propeller may be implemented in assembly or machine language. The language may be a compiled or interpreted language. Program code for implementing the methods and systems for feathering an aircraft propeller may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for feathering an aircraft propeller may also be considered to be implemented by way of a non-transitory computer-readable storage medium having a computer program stored thereon. The computer program may comprise computer-readable instructions which cause a computer, or in some embodiments the processing unit 712 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for feathering an aircraft propeller may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A system for feathering an aircraft propeller having coupled thereto an actuator for setting a blade pitch of the propeller, the blade pitch controlled by modulating a supply of hydraulic fluid to the actuator, the system comprising:
   a first feather solenoid and a second feather solenoid each comprising at least one solenoid coil and a solenoid valve coupled to the actuator and to the at least one solenoid coil; and
   at least one controller configured to selectively energize and de-energize the at least one solenoid coil, the solenoid valve of the first feather solenoid configured to be activated when the at least one solenoid coil of the first feather solenoid is energized and the solenoid valve of the second feather solenoid configured to be activated when the at least one solenoid coil of the second feather solenoid is de-energized,
   the solenoid valve configured to, when activated, modulate the supply of hydraulic fluid to the actuator for adjusting the blade pitch of the propeller towards a feather position.

2. The system of claim 1, wherein the at least one solenoid coil comprises a first solenoid coil and a second solenoid coil, each of the first solenoid coil and the second solenoid coil having a first end for connection to ground and a second end for connection to a power source, the solenoid valve of the first feather solenoid configured to be activated when at least one of the first solenoid coil and the second solenoid coil of the first feather solenoid is energized and the solenoid valve of the second feather solenoid configured to be activated when the first solenoid coil and the second solenoid coil of the second feather solenoid are de-energized.

3. The system of claim 2, wherein the at least one controller comprises a first solenoid driver to selectively energize and de-energize the first solenoid coil of the first feather solenoid and a second solenoid driver to selectively energize and de-energize the first solenoid coil of the second feather solenoid, the at least one controller comprising a first channel for controlling the first solenoid driver and a second channel for controlling the second solenoid driver.

4. The system of claim 3, wherein the at least one controller is a full authority digital engine control (FADEC) and the first channel and the second channel are redundant channels.

5. The system of claim 3, wherein, the first solenoid driver is configured to energize the first solenoid coil of the first feather solenoid in response to receiving a feather command and the second solenoid driver is configured to energize the second solenoid coil of the first feather solenoid in response to receiving the feather command.

6. The system of claim 5, wherein each of the first solenoid driver and the second solenoid driver comprises a first electrical switch connected to the first end of a corresponding one of the first solenoid coil and the second solenoid coil of the first feather solenoid, the first electrical switch controllable between an open position and a closed position and configured to, when in the closed position, connect the corresponding solenoid coil of the first feather solenoid to ground and to, when in the open position, disconnect the corresponding solenoid coil of the first feather solenoid from ground.

7. The system of claim 6, wherein each of the first solenoid driver and the second solenoid driver comprises a second electrical switch connected to the first end of a corresponding one of the first solenoid coil and the second solenoid coil of the second feather solenoid, the second electrical switch controllable between an open position and a closed position and configured to, when in the closed position, connect the corresponding solenoid coil of the second feather solenoid to ground and to, when in the open position, disconnect the corresponding solenoid coil of the second feather solenoid from ground.

8. The system of claim 7, wherein the first electrical switch and the second electrical switch are configured to default to the open position when the at least one controller is unpowered.

9. The system of claim 7, wherein the first electrical switch of the first solenoid driver and the first electrical switch of the second solenoid driver are each configured to move to the closed position in response to receiving the feather command.

10. The system of claim 7, wherein the second electrical switch of the first solenoid driver is configured to default to the open position when the first channel is non-functioning and the second electrical switch of the second solenoid driver is configured to default to the open position when the second channel is non-functioning.

11. The system of claim 6, wherein the corresponding solenoid coil is energized when at least one of the first electrical switch of the first solenoid driver and the first electrical switch of the second solenoid driver is in the closed position.

12. A method for feathering an aircraft propeller having coupled thereto an actuator for setting a blade pitch of the propeller, the method comprising:
providing a first feather solenoid configured as electrically powered to command the propeller to feather and a second feather solenoid configured as electrically de-powered to command the propeller to feather, the first and the second solenoid coupled to the actuator;
when at least one controller configured to selectively energize and de-energize the first and the second feather solenoid is functioning, operating in a first mode in which the first feather solenoid is energized to command the actuator to adjust the blade pitch towards a feather position; and
when the at least one controller is non-functioning, operating in a second mode in which the second feather solenoid is de-energized to command the actuator to adjust the blade pitch towards the feather position.

13. The method of claim 12, wherein the first feather solenoid and the second feather solenoid are each provided as comprising at least one solenoid coil and a solenoid valve coupled to the actuator and to the at least one solenoid coil.

14. The method of claim 13, further wherein, when the at least one controller is functioning, the at least one solenoid coil is energized to activate the solenoid valve of the first feather solenoid for commanding the actuator to adjust the blade pitch towards the feather position.

15. The method of claim 14, wherein, when the at least one controller is non-functioning, the at least one solenoid coil of the second feather solenoid is de-energized to activate the solenoid valve of the second feather solenoid for commanding the actuator to adjust the blade pitch towards the feather position.

16. The method of claim 13, further wherein, when the at least one controller is functioning, at least one of a first solenoid coil and a second solenoid coil of the first feather solenoid is energized to activate the solenoid valve of the first feather solenoid for commanding the actuator to adjust the blade pitch towards the feather position.

17. The method of claim 16, wherein, when the at least one controller is non-functioning, a first solenoid coil and a second solenoid coil of the second feather solenoid are de-energized to activate the solenoid valve of the second feather solenoid for commanding the actuator to adjust the blade pitch towards the feather position.

18. The method of claim 16, wherein the at least one controller is configured to activate the first solenoid valve by commanding a first solenoid driver to energize the first solenoid coil of the first feather solenoid and commanding a second solenoid driver to energize the second solenoid coil of the first feather solenoid.

19. The method of claim 18, wherein commanding the first solenoid driver to energize the first solenoid coil of the first feather solenoid comprises commanding a first electrical switch of the first solenoid driver to a closed position for connecting the first solenoid coil of the first feather solenoid to ground, and further wherein commanding the second solenoid driver to energize the second solenoid coil of the first feather solenoid comprises commanding a first electrical switch of the second solenoid driver to a closed position for connecting the second solenoid coil of the first feather solenoid to ground.

20. The method of claim 12, further comprising, when the at least one controller is functioning, assessing whether the propeller is in the feather position and operating in the second mode when it is determined that the propeller is not in the feather position.

* * * * *